(12) United States Patent
El-Lateef Ahmed et al.

(10) Patent No.: US 11,969,710 B1
(45) Date of Patent: Apr. 30, 2024

(54) $LU_2O_3$@ZNO NANOCOMPOSITES FOR PHOTODEGRADATION OF TEXTILE WASTEWATER DYES

(71) Applicant: KING FAISAL UNIVERSITY, Al-Ahsa (SA)

(72) Inventors: Hany Mohamed Abd El-Lateef Ahmed, Al-Ahsa (SA); Mai Mostafa Khalaf Ali, Al-Ahsa (SA); Ateyatallah Aljuhani, Al-Ahsa (SA); Wael H Alsaedi, Al-Ahsa (SA); Ahmed M. Abu-Dief, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/218,464

(22) Filed: Jul. 5, 2023

(51) Int. Cl.
*B01J 23/10* (2006.01)
*B01F 33/45* (2022.01)
*B01J 23/06* (2006.01)
*B01J 35/23* (2024.01)
*B01J 35/30* (2024.01)
*B01J 35/39* (2024.01)
*B01J 37/02* (2006.01)
*B01J 37/03* (2006.01)
*B01J 37/04* (2006.01)
(Continued)

(52) U.S. Cl.
CPC ............... *B01J 23/10* (2013.01); *B01F 33/45* (2022.01); *B01J 23/06* (2013.01); *B01J 35/23* (2024.01); *B01J 35/39* (2024.01); *B01J 35/393* (2024.01); *B01J 37/0236* (2013.01); *B01J 37/031* (2013.01); *B01J 37/04* (2013.01); *B01J 37/088* (2013.01); *C02F 1/32* (2013.01); *C02F 1/725* (2013.01); *B01F 2101/305* (2022.01); *C02F 2101/308* (2013.01); *C02F 2103/30* (2013.01); *C02F 2305/08* (2013.01); *C02F 2305/10* (2013.01)

(58) Field of Classification Search
CPC ........ A61K 33/30; A61K 9/14; A61K 31/635; A61K 1/04; B01J 23/10; B01J 33/45
See application file for complete search history.

(56) References Cited

FOREIGN PATENT DOCUMENTS

| CN | 105246837 A | * | 1/2016 | .............. B63J 4/002 |
| CN | 105461008 A | * | 4/2016 | .............. B01J 23/30 |

(Continued)

OTHER PUBLICATIONS

Ano-particle Powder Composition And Preparation Method Thereof; CN 105849203 A; Aug. 10, 2016; Ventor Information Name Baran Jr, J R (Year: 2016).*

(Continued)

*Primary Examiner* — Walter D. Griffin
*Assistant Examiner* — Cameron J Allen
(74) *Attorney, Agent, or Firm* — Nath, Goldberg & Meyer; Richard C. Litman

(57) ABSTRACT

A $Lu_2O_3$@ZnO nanocomposite includes $Lu_2O_3$ and ZnO. The nanocomposite can have an average diameter ranging from about 20 nm to about 25 nm. The nanocomposite can be used as a photocatalyst for photodegradation of organic dyes. In an embodiment, the organic dyes include textile wastewater dyes. In an embodiment, the textile wastewater dyes include methylene blue (MB).

3 Claims, 3 Drawing Sheets

(51) Int. Cl.
  *B01J 37/08* (2006.01)
  *C02F 1/32* (2023.01)
  *C02F 1/72* (2023.01)
  *B01F 101/00* (2022.01)
  *C02F 101/30* (2006.01)
  *C02F 103/30* (2006.01)

(56) References Cited

FOREIGN PATENT DOCUMENTS

| CN | 110420631 A | 11/2019 |
| CN | 112076739 A | 12/2020 |

OTHER PUBLICATIONS

Optical Catalytic Agent, The Slurry Mixture, Molding Material, And Coating, Coating Film-forming Material, A Sintered Body, Glass Ceramic, Glass, Building Material And Purifying Material; CN 102947001 A; Feb. 27, 2013; Fu, Jie (Year: 2013).*

CN 105461008 A Translation (Year: 2016).*

Tabatabaeinejad et al., "Magnetic Lu2Cu2O5-based ceramic nanostructured materials fabricated by a simple and green approach for an effective photocatalytic degradation of organic contamination," Royal Society of Chemistry, 11 (2021): 40100-40111.

Orooji, et al. "Gd2ZnMnO6/ZnO nanocomposites: Green sol-gel auto-combustion synthesis, characterization and photocatalytic degradation of different dye pollutants in water," Journal of Alloys and Compounds, 835 (2020) 155240.

Ali et al., "Effect of calcination temperature on the photoactivities of ZnO/SnO2 nanocomposites for the degradation of methyl orange," Materials Chemistry and Physics 213 (2018) 259-266.

* cited by examiner

LU$_2$O$_3$@ZNO NANOCOMPOSITES FOR PHOTODEGRADATION OF TEXTILE WASTEWATER DYES

BACKGROUND

Field

The disclosure of the present patent application relates to photocatalysts for photodegradation of organic dyes, and particularly to Lu$_2$O$_3$@ZnO nanocomposites for photodegradation of organic dyes.

Description of Related Art

Dyes are utilized in many industries, such as textile, rubber, coating, paint, and automobile industries. A major source of dye pollution is the textile industry. In many countries in the Middle East, textile industries contribute significantly to economic growth. As these dyes are toxic, they must be separated and eliminated from effluents before the effluents are released into the environment.

To eliminate the toxic effect of dyes in the environment, many dye elimination methods have been tested such as adsorption, oxidation, reduction, and precipitation. Due to their chemical structure, origin, and application, different dyes have different chemical and physical properties. Accordingly, some dyes must be handled differently from others.

Nanoparticles have a large surface area which can be helpful for the removal of dyes from wastewater. Due to the high surface area to volume ratio, nanoparticles can be combined more efficiently with dye molecules for degradation, increasing the number of dye molecules that can be degraded.

Catalysts used in photo-induced reactions are very attractive to be used in green procedures for photodegradation of toxic dyes. Such catalysts or photocatalysts convert light energy to chemical energy and are also known to be environment-friendly tools for various environmental issues.

Thus, a photocatalyst solving the aforementioned problems is desired.

SUMMARY

The present subject matter relates to a nanocomposite including Lu$_2$O$_3$ and ZnO nanoparticles, or a "Lu$_2$O$_3$@ZnO nanocomposite." In an embodiment, the nanoparticles om the nanocomposite can have an average diameter ranging from about 20 nm to about 25 nm. The nanocomposite can be used as a photocatalyst for photodegradation of organic dyes. In an embodiment, the organic dyes include textile wastewater dyes. In an embodiment, the textile wastewater dyes include methylene blue (MB).

In one embodiment, the present subject matter relates to a method for photodegradation of organic dyes including dispersing a Lu$_2$O$_3$@ZnO nanocomposite in a solution including the organic dyes to provide a mixture and irradiating the mixture with ultraviolet light.

In another embodiment, the present subject matter relates to a method for making the nanocomposite of claim 1, the method comprising: dissolving Europium (III) nitrate Lu(NO$_3$)$_3$·6H$_2$O and cadmium nitrate Zn(NO$_3$)$_2$·4H$_2$O in water to obtain a solution; precipitating solid products from the solution; drying the solid products to obtain ZnCO$_3$ and Lu$_2$(CO$_3$)$_3$ metal carbonates; calcinating the ZnCO$_3$ and Lu$_2$(CO$_3$)$_3$ metal carbonates at a temperature of about 725° C. to about 760° C.; and obtaining the nanocomposite.

These and other features of the present subject matter will become readily apparent upon further review of the following specification.

DETAILED DESCRIPTION

Figure 1:
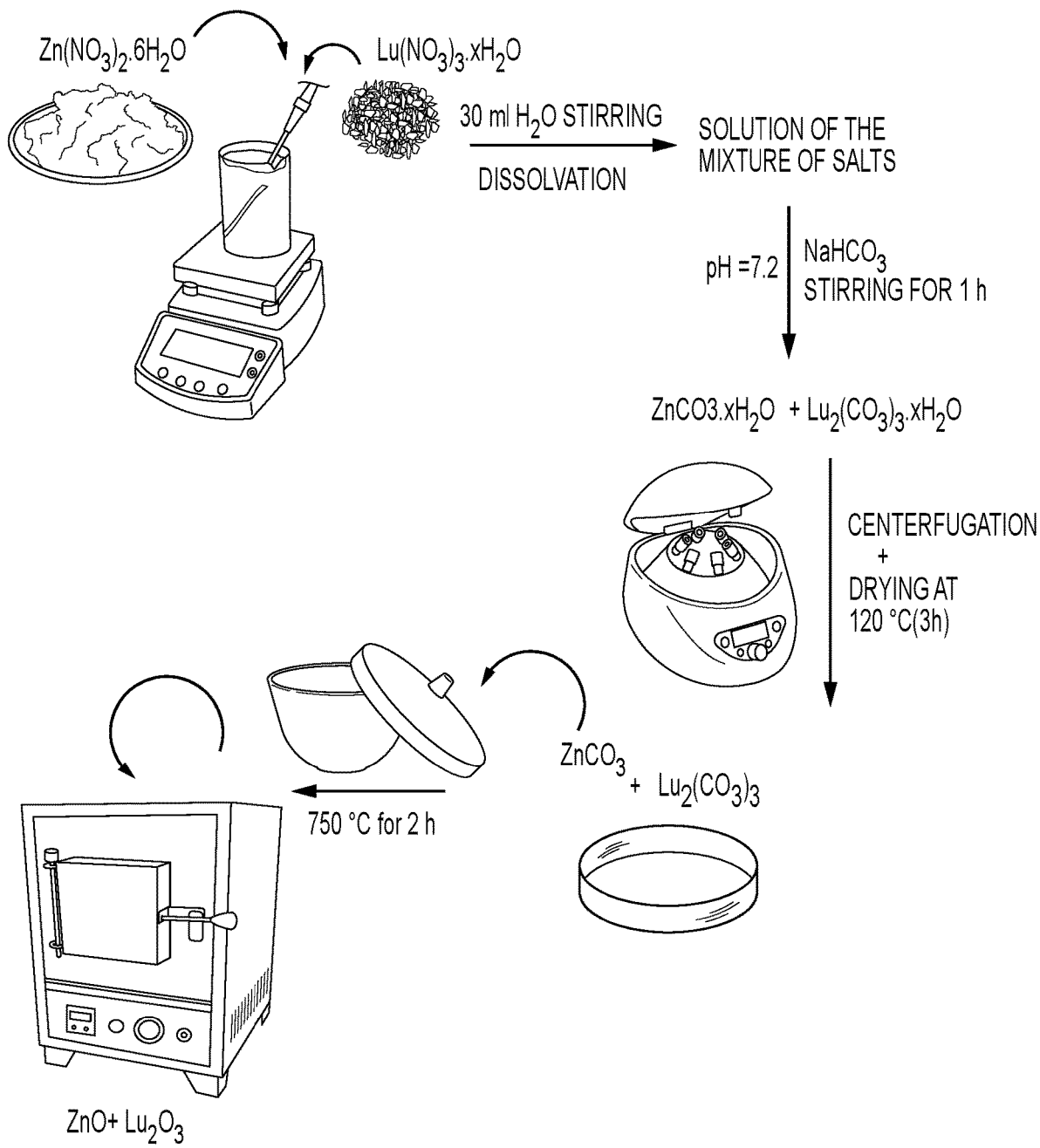
FIG. 1 is a reaction scheme for preparing the Lu$_2$O$_3$@ZnO nanocomposites.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a nanocomposite including $Lu_2O_3$ and ZnO nanoparticles (NPs), also referred to herein as a $Lu_2O_3$@ZnO nanocomposite. In an embodiment, the nanoparticles in the $Lu_2O_3$@ZnO nanocomposite can have an average diameter ranging from about 20 nm to about 25 nm. The nanocomposite can be used as a photocatalyst for photodegradation of organic dyes. In an embodiment, the organic dyes include textile wastewater dyes. In an embodiment, the textile wastewater dyes include methylene blue (MB). The present nanocomposite can provide a more efficient photodegradation of the organic dyes than ZnO alone, or than any oxides (other than $Lu_2O_3$) mixed with ZnO. In this regard, the present nanocomposites can provide an about 97% photodegradation, or degradation, of the organic dyes.

The nanocomposite can include $Lu_2O_3$ which has a high melting point and phase stability and low thermal expansion. $Lu_2O_3$ is also known to have a wide band gap of 5.2-5.5 eV and a high-κ dielectric constant of about κ=11-13. $Lu_2O_3$ possesses a unique set of characteristics like considerable mechanical strength, hardness, and thermal conductivity. $Lu_2O_3$ can be easily doped with ions of rare earth elements.

According to an embodiment, a method for photodegradation of organic dyes can include dispersing a $Lu_2O_3$@ZnO nanocomposite in an aqueous solution including the organic dye to provide a mixture and subjecting the mixture to light irradiation. In an embodiment, a concentration of the organic dye in the solution is about 10 mg/L. Other concentrations of the organic dye in the solution are further contemplated herein including, by way of non-limiting example, about 5 to about 15 mg/L, about 5 mg/L, about 10 mg/L, or about 15 mg/L. In an embodiment, about 25 mg to about 35 mg of the $Lu_2O_3$@ZnO nanocomposite, about 35 mg, about 26 mg, about 27 mg, about 28 mg, about 29 mg, about 30 mg, about 31 mg, about 32 mg, about 33 mg, about 34 mg, about 35 mg, or about 30 mg of the nanocomposite can be dissolved in about 45 ml to about 55 mL of the solution, or in about 50 mL of the solution.

In an embodiment, the mixture can be subjected to light irradiation selected from ultraviolet (UV) radiation and visible light (Vis) radiation. In an embodiment, light irradiation is ultraviolet (UV) radiation with a main emission wavelength of about 254 nm. In an embodiment, the mixture is stirred to achieve an adsorption-desorption equilibrium prior to irradiating the mixture. In an embodiment, the mixture can be magnetically stirred prior to irradiation. In an embodiment, the mixture can be magnetically stirred for a period of time ranging from about one hour to about two hours.

In another embodiment, the present subject matter relates to a method for making the present nanocomposites, the method comprising: dissolving Europium (III) nitrate $Lu(NO_3)_3 \cdot 6H_2O$ and cadmium nitrate $Zn(NO_3)_2 \cdot 4H_2O$ in water to obtain a solution; precipitating solid products from the solution; drying the solid products to obtain $ZnCO_3$ and $Lu_2(CO_3)_3$ metal carbonates; calcinating the $ZnCO_3$ and $Lu_2(CO_3)_3$ metal carbonates at a temperature of about 725° C. to about 760° C.; and obtaining the nanocomposite.

In an embodiment in this regard, a solution of $NaHCO_3$ can be added dropwise to the solution until the solution reaches a pH of about 7.2 before the solid products are precipitated. Similarly, the calcinating can occur for at least about 2 hours with a heating rate of about 10° C. per minute.

For example, the $Lu_2O_3$@ZnO nanocomposites can be prepared by dissolving $Lu(NO_3)_3 \cdot 6H_2O$ and $Zn(NO_3)_2 \cdot 4H_2O$ in water to provide a mixture. A solution of $NaHCO_3$ can be added to the mixture dropwise until a pH of the mixture is about pH 7.2. The mixture can be centrifuged and washed with water, then dried to obtain a $ZnCO_3$ powder and a $Lu_2(CO_3)_3$) powder. The obtained powders can be ground and passed through meshes, then calcinated. In an embodiment, the powders can be calcinated at a temperature ranging from about 700° C. to about 800° C. for about 1 hour to about 3 hours, with a heating rate of about 10° C. to about 20° C. per minute.

The present teachings are illustrated by the following examples.

EXAMPLES

Synthetic Examples

Example 1

Synthesis of $Lu_2O_3$@ZnO Nanocomposites $Lu_2O_3$@ZnO nanocomposites were prepared via a combination of precipitation and calcination methods according to the reaction scheme shown in FIG. 1.

Mixed oxide nanoparticles encompassing $Lu_2O_3$ and ZnO nanoparticles (NPs) ($Lu_2O_3$=0, 4, 8, and 12%) were prepared by dissolving stoichiometric molar concentrations of $Lu(NO_3)_3 \cdot 6H_2O$ (for $Lu_2O_3$— ZnO NPs) and $Zn(NO_3)_2 \cdot 4H_2O$ in 25 ml water and stirring magnetically until the reactants dissolved completely. Later, a solution of $NaHCO_3$ was added to the dissolved mixture dropwise with stirring until pH 7.2 was achieved. The obtained solid products were magnetically stirred additionally for half an hour, centrifuged, and washed several times with bi-distilled water, and dried at 120° C. for 3 hours to obtain metal carbonates ($ZnCO_3$ and $Lu_2(CO_3)_3$). The obtained powders were ground to pass through meshes and then put in a crucible for calcination at 750° C. for 2 hours with a heating rate of 10° C. per minute. Finally, the obtained powders were used for characterization.

Example 2

Characterization of $Lu_2O_3$@ZnO Nano-Composites Using SEM

Figure 2A:
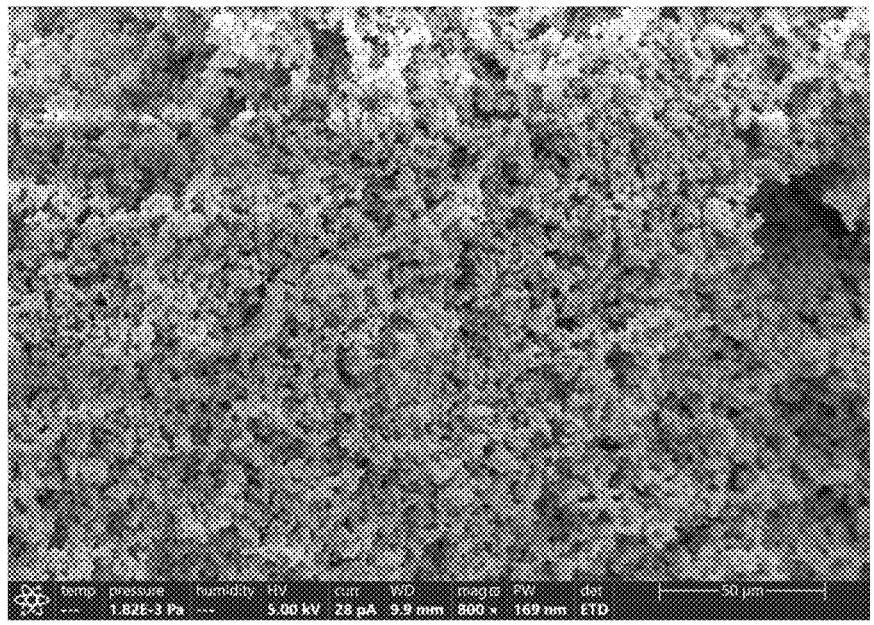
FIG. 2A is a Scanning Electron Microscopy image (SEM) of the Lu$_2$O$_3$@ZnO nanocomposites
Figure 2B:
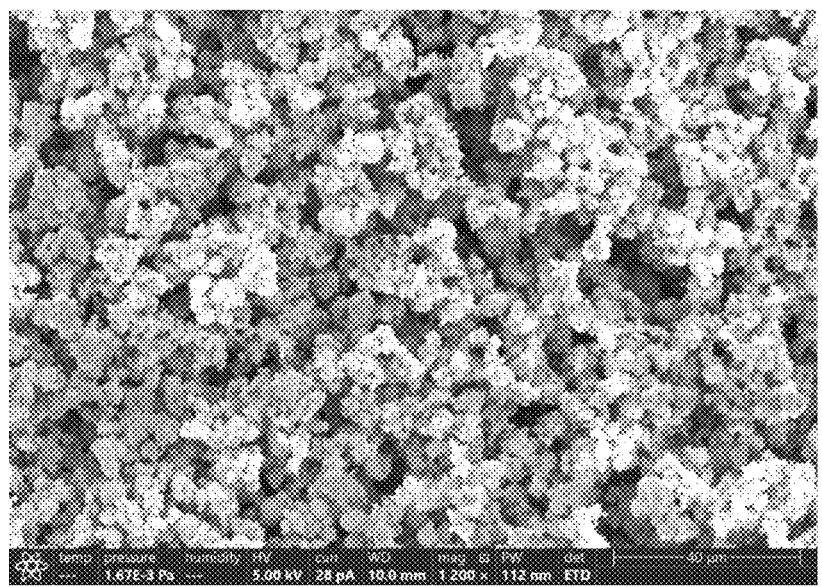
FIG. 2B is a Scanning Electron Microscopy image (SEM) of the Lu$_2$O$_3$@ZnO nano-composites.
Figure 3:
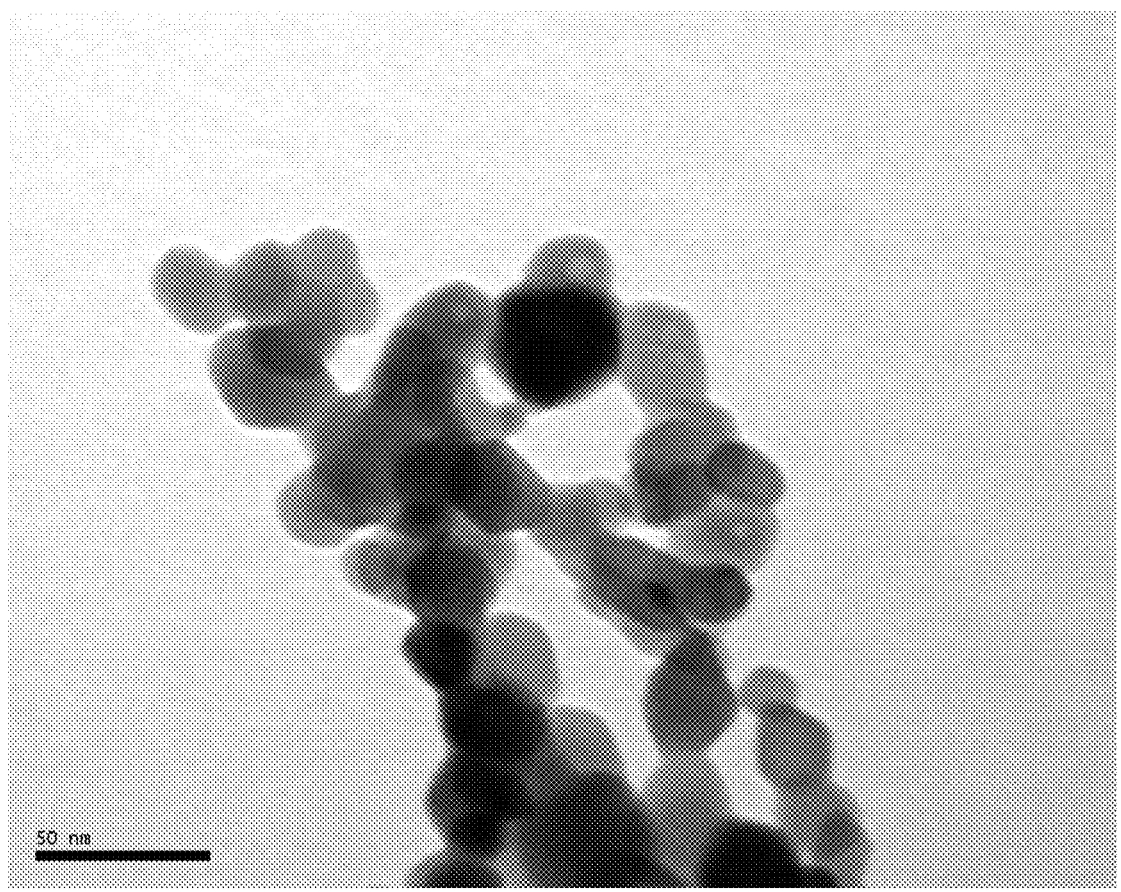
FIG. 3 is a Transmission Electron Microscopy image (TEM) of the Lu$_2$O$_3$@ZnO nanocomposites.

The surface morphology of pure ZnO nanoparticles and mixed $Lu_2O_3$ and ZnO nanocomposites was examined by scanning electron microscopy (SEM) as illustrated in FIGS. 2A-2B. SEM analysis verified that the pure ZnO nanoparticle sample had a spherical shape with good separation of particles. TEM analysis revealed that the prepared $Lu_2O_3$@ZnO nanocomposites lie within the range of 20 nm-25 nm, as shown in FIG. 3.

Example 3

Photocatalytic Activity Test

The photocatalytic activities of the as-synthesized samples were investigated by the photo-degradation of methylene blue (MB) dye as a pollutant model under ultraviolet (UV) irradiation (30 Watt, 280 nm-100 nm UV-C Germicidal lamp with main emission wavelength 254 nm). The degradation efficiency depended on illumination time and was evaluated by using a double-beam UV-VIS-NIR spectrophotometer. In a typical experiment, 30 mg of the photocatalyst was dispersed in 50 ml MB aqueous solution at a concentration of 10 mg/L to produce a suspension for the degradation reaction. Prior to illumination, the obtained solution was magnetically stirred in the dark for 60 minutes to attain adsorption-desorption equilibrium. All experiments were performed under the same experimental conditions (at RT, constant magnetic stirring, and natural pH). During the UV irradiation and at regular intervals about 4 ml of suspension was sampled by syringe and subsequently centrifuged at a rate of 4000 rpm to remove the photocatalyst powder from the MB solution. In order to monitor the degradation of the MB, the absorption spectra and then the concentration of MB in the UV-Vis region was monitored by Jasco, V-570 UV-Vis-NIR Spectrophotometer.

The degradation efficiency for $Lu_2O_3$/ZnO nanocomposites (8%) compared with ZnO NPs showed enhancement in activity from 80% in ZnO to 97% in $Lu_2O_3$/ZnO (8%). This could be ascribed to the increase in the surface area of the $Lu_2O_3$/ZnO nanocomposites (8%) compared with the ZnO nanoparticles.

It is to be understood that the $Lu_2O_3$@ZnO nanocomposites are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method for making a nanocomposite comprising $Lu_2O_3$ and ZnO nanoparticles, the method comprising:
    dissolving $Lu(NO_3)_3 \cdot 6H_2O$ and $Zn(NO_3)_2 \cdot 4H_2O$ in water to obtain a solution;
    precipitating solid products from the solution;
    drying the solid products to obtain $ZnCO_3$ and $Lu_2(CO_3)_3$ metal carbonates;
    calcinating the $ZnCO_3$ and $Lu_2(CO_3)_3$ metal carbonates at a temperature of about 725° C. to about 760° C.; and
    obtaining the nanocomposite.

2. The method of claim 1, wherein a solution of $NaHCO_3$ is added dropwise to the solution until the solution reaches a pH of about 7.2 before the solid products are precipitated.

3. The method of claim 1, wherein the calcinating occurs for at least about 2 hours with a heating rate of about 10° C. per minute.

* * * * *

UNITED STATES PATENT AND TRADEMARK OFFICE
CERTIFICATE OF CORRECTION

PATENT NO. : 11,969,710 B1
APPLICATION NO. : 18/218464
DATED : April 30, 2024
INVENTOR(S) : Hany Mohamed Abd El-Lateef Ahmed et al.

It is certified that error appears in the above-identified patent and that said Letters Patent is hereby corrected as shown below:

On the Title Page

Item (72) Inventors, please remove the Inventor city for Inventors 3-5 currently listed as:
ATEYATALLAH ALJUHANI, Al-Ahsa (SA); WAEL H. ALSAEDI, Al-Ahsa (SA); AHMED M. ABU-DIEF, Al-Ahsa (SA)

And replace with:
ATEYATALLAH ALJUHANI, Al-Madina Al-Mounawara (SA); WAEL H. ALSAEDI, Al-Madina Al-Mounawara (SA); AHMED M. ABU-DIEF, Al-Madina Al-Mounawara (SA)

Signed and Sealed this
Fourth Day of June, 2024

Katherine Kelly Vidal
*Director of the United States Patent and Trademark Office*